US006214458B1

(12) United States Patent
Kobayashi et al.

(10) Patent No.: US 6,214,458 B1
(45) Date of Patent: Apr. 10, 2001

(54) IMAGE RECORDING SHEET COMPRISING A WHITE PARTICLE RESIN LAYER

(75) Inventors: Takashi Kobayashi; Tatsuya Nomura; Kouichi Suematsu, all of Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/008,586

(22) Filed: Jan. 16, 1998

(30) Foreign Application Priority Data

Jan. 17, 1997 (JP) ........ 9-019691

(51) Int. Cl.$^7$ ........ B32B 3/00

(52) U.S. Cl. ........ 428/332; 428/206; 428/334; 428/335; 428/480; 428/500; 428/910; 428/195

(58) Field of Search ........ 428/105, 195, 428/207, 212, 500, 327, 520, 341, 342, 511, 537, 206, 332, 334, 335, 480, 910

(56) References Cited

U.S. PATENT DOCUMENTS 4,371,582 * 2/1983 Sugiyama et al. ........ 428/341
4,642,247 * 2/1987 Mouri et al. ........ 427/214
5,372,884 * 12/1994 Abe et al. ........ 428/331
5,582,902 * 12/1996 Kanbayashi et al. ........ 428/206
5,670,448 * 9/1997 Kometani ........ 503/227
5,910,359 * 6/1999 Kobayashi ........ 428/327

* cited by examiner

*Primary Examiner*—Bruce H. Hess
*Assistant Examiner*—Michael Grendzynski
(74) *Attorney, Agent, or Firm*—Nixon Peabody LLP; Jeffrey L. Costellia

(57) ABSTRACT

An image recording sheet and image forming processes employing the image recording sheet are disclosed. The image recording sheet has a high glossiness and forms on its surface an image of a high quality, especially from the viewpoint of a high glossiness and a good graininess. The image recording sheet is composed of a transparent support film, a transparent image-receiving layer provided on one surface of the support film, and a white coated layer provided on the other surface of the support film. The image recording sheet is employable for forming a glossy image on its surface by ink-jet recording, electrophotography, or thermal transfer recording.

7 Claims, 1 Drawing Sheet

FIGURE
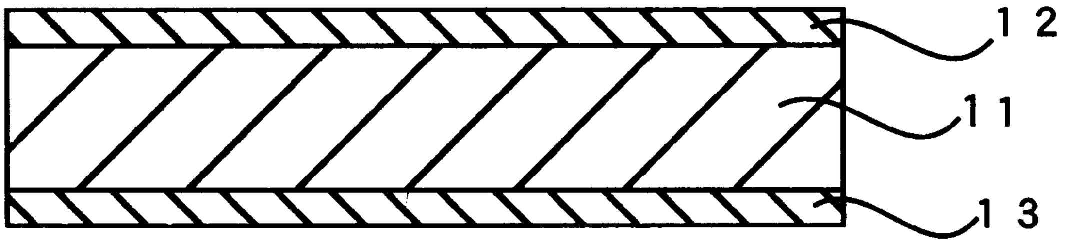

IMAGE RECORDING SHEET COMPRISING A WHITE PARTICLE RESIN LAYER

FIELD OF THE INVENTION

The present invention relates to an image recording sheet. In particular, the invention relates to an image recording sheet employable for forming an image of a high glossiness and a good graininess by ink-jet recording, electrophotography, or thermal transfer recording.

BACKGROUND OF THE INVENTION

In the field of information industry, a variety of image recording and printing methods have been developed and practically employed. Among them, ink-jet recording and thermal transfer recording (printing) are widely used because apparatuses for such recording methods are light-weight, downsized and noiseless, as well as excellent in their workability and maintenance. Those apparatuses, moreover, can be easily modified to perform color recording. In addition to the above methods, color electrophotographic printers and copy machines, which can give full-color electrophotographic images of high resolution, have been recently developed and brought on market.

In the ink-jet recording, there are three types of methods classified according to the kind of ink employed in printing process, namely, method with aqueous ink, oily ink or wax ink. In any of those methods, an image is formed by applying the ink in the form of fine droplets onto a recording sheet.

Methods of thermal transfer recording can be classified into two types. One is a method using a thermal transfer sheet having a support and a melting ink layer coated thereon. In this method, the thermal transfer sheet is imagewise heated from the support side to melt the ink, and then the imagewise melted ink is transferred onto a recording sheet to form an image. Another method uses a thermal transfer sheet comprising a sublimating dye and a resin of a high softening point. In this method, the thermal transfer sheet is imagewise heated to sublimate the dye, and then the imagewise sublimated dye is transferred onto a recording sheet.

An electrophotographic printing method generally comprises the steps of: imagewise exposing a light-sensitive material to light, to form a latent image; developing the latent image with a toner to form a toner image on the surface of the light-sensitive material; transferring the formed toner image onto a recording sheet; and fixing the transferred toner image under heating.

Images recorded by the above methods are sometimes required to have a high glossiness, as well as a high resolution. In more detail, an image printed on a recording sheet is desired to have a high glossiness which appears close to that produced by silver-salt photography. In order to give a high glossiness to the image, the image recording sheet generally needs to comprise a highly transparent image-receiving layer, which is often provided on a white film support.

A recording sheet of the above-mentioned type is shown, for example, in Japanese Patent Provisional Publication No. H5-51469. The publication discloses an image recording sheet comprising: a polyethylene terephthalate film support containing calcium carbonate; and an image-receiving layer containing acrylic polymer emulsion, poly(vinyl alcohol), and colloidal silica. The image-receiving layer of the recording sheet has a relatively high transparency, and is provided on the white polyethylene terephthalate support film. Besides this, other white film supports are also known. Examples of such films include a polyester film containing dispersed barium sulfate particles (Japanese Patent Publication No. 60-30930), a polyester film containing calcium carbonate in an amount of 8 to 30 weight % (Japanese Patent Publication No. H7-15012), and a polyester film containing titanium oxide (Japanese Patent Publication No. H7-149926).

The present inventors, however, have noted that the known image recording sheet often gives an image of poor quality, especially from the viewpoint of graininess. In more detail, the known recording sheet often gives an image of a low quality such as an image having a series of beads-like spots of ink or toner (i.e., beading).

SUMMARY OF THE INVENTION

It is an object of the present invention to provide an image recording sheet which gives an image of improved quality, especially in the graininess and glossiness.

It is another object of the invention to provide an image recording sheet which gives an image of improved quality by ink-jet recording and the ink-jet recording image forming method.

It is a further object of the invention to provide an electrophotographic recording sheet which gives an image of improved quality and the electrophotographic process.

It is a still further object of the invention to provide an image recording sheet which gives an image of improved quality by thermal transfer recording (printing) and a thermal transfer image forming process.

The present invention resides in an image recording sheet comprising a transparent support film, a transparent image-receiving layer provided on one surface of the support film, and a white coated layer provided on the other surface of the support film.

The image-receiving layer preferably has a surface showing a glossiness of not less than 75% (preferably not less than 80%), and the white coated layer preferably shows a parallel rays transmittance of not more than 2%.

The invention also resides in an image forming process which comprises the steps of:

- imagewise applying an aqueous ink onto an image recording sheet comprising a transparent support film, a transparent image-receiving layer provided on one surface of the support film and a white coated layer provided on the other surface of the support film on the side of the image-receiving layer; and
- drying the aqueous ink on the image-receiving layer to form an ink image on the image-receiving layer.

For the above-mentioned image forming process, any one of the following image recording sheets are favorably employable.

The image recording sheet, wherein the image-receiving layer comprises a hydrophilic polymer and cationic polymer particles having a mean particle size of 1 to 200 nm.

The image recording sheet, wherein the image-receiving layer comprises a basic polymer latex having the formula (I):

$$-(A)_x-(B)_y-(C)_z- \quad (I)$$

wherein A represents a monomer unit comprising an ethylenic unsaturated double bond and a basic group selected from the group consisting of a tertiary amino group and a quaternary ammonium base; B represents a monomer unit comprising at least two ethylenic unsaturated double bonds; C represents a monomer unit having an ethylenic unsaturated double bond but differing from the monomer units of A and B; x means 10 to 90 mol %; y means 0 to 90 mol %; and z means 0 to 90 mol %.

The invention further resides in an image forming process which comprises the steps of:

imagewise exposing a light-sensitive material to light, to form a latent image;

developing the latent image with a toner comprising a colorant material and a binder resin, to form a toner image on the surface of the light-sensitive material;

transferring the toner image onto an image recording sheet comprising a transparent support film, a transparent image-receiving layer provided on one surface of the support film and a white coated layer provided on the other surface of the support film on the side of the image-receiving layer; and heating and pressing the transferred toner image, to fix the toner image onto the image-receiving layer.

For the above-mentioned image forming process, the following image recording sheet is favorably employable.

The image recording sheet, wherein the image-receiving layer comprises a thermoplastic polyester resin having a glass transition temperature of 35 to 120° C.

The invention still further resides in an image forming process which comprises the steps of:

placing an ink sheet having a layer of wax ink thereon, on an image recording sheet comprising a transparent support film, a transparent image-receiving layer provided on one surface of the support film and a white coated layer provided on the other surface of the support film under the condition that the layer of wax ink is brought into contact with the image-receiving layer;

imagewise heating the ink sheet, whereby imagewise melting and transferring the wax ink onto the image-receiving layer; and separating the ink sheet from the image recording sheet to leave the imagewise transferred wax ink on the image-receiving layer.

For the above-mentioned image forming process, the following image recording sheet is favorably employable.

The image recording sheet, wherein the image-receiving layer comprises a polyolefin resin and hydrophobic particles having a mean particle size of 2 to 15 μm.

BRIEF DESCRIPTION OF THE DRAWINGS

FIGURE is a sectional view illustrating a representative structure of the image recording sheet of the invention.

DETAILED DESCRIPTION OF THE INVENTION

The image recording sheet of the invention has a basic structure comprising a support film, an image-receiving layer provided on one surface of the support film, and a white coated layer provided on the other surface of the support film.

The attached Figure is a sectional view illustrating a representative structure of the recording sheet. The sheet of Figure is composed of a transparent support film 11, an image-receiving layer 12 provided on one surface of the support film 11, and a white coated layer 13 provided on the other surface of the support film 11. The white coated layer gives a favorably effect on the quality (graininess) of an image obtained by ink-jet recording, electrophotography or thermal transfer recording.

The image recording sheet of the invention can be prepared, for example, in the following manner.

For a film employed as the transparent support film, any materials can be used, provided that they have sufficient transparency. Examples of the materials include: polyesters such as polyethylene terephthalate and polyethylene naphthalate; cellulose esters such as nitrocellulose, cellulose acetate and cellulose acetate butyrate; polysulfone; polyphenylene oxide; polyimide; polycarbonate; and polyamide. Preferred is polyester, especially polyethylene terephthalate. Although there is no specific limitation on the thickness of the support, the thickness preferably is in the range of 50 to 200 μm from the viewpoint of easy handling.

A subbing layer, which comprises a polymer, can be provided on the support film. Examples of the polymers include styrene/butadiene copolymer, polyvinylidene chloride, polyvinyl chloride, polyvinyl acetate, polyvinyl formal, polyvinyl butyral, polyvinylidene fluoride, polyester, polyamide, acrylic resin, and gelatin. Preferred are styrene/butadiene copolymer, polyvinylidene chloride, polyvinylidene fluoride, polyester, polyamide, and gelatin. Among them, styrene/butadiene copolymer, polyvinylidene chloride and polyester are particularly preferred for ink-jet recording and electrophotography. For thermal transfer recording, gelatin may be preferred. Each of the above polymers preferably contains a hydroxyl group, a carboxyl group, an amino group and/or a carbonyldioxy group. These groups can be generally introduced into the polymers by copolymerization.

The subbing layer is preferably formed of a latex of the above polymer. Especially, styrene/butadiene copolymer latex or polyvinylidene chloride latex are preferred. The subbing layer preferably contains a crosslinking agent such as triazine derivatives (e.g., 2,4-dichloro-6-dihydroxy-s-triazine). The crosslinking agent also works as an agent for improving adhesion.

The thickness of the subbing layer generally is in the range of 0.01 to 1.0 μm. The surface of the support, on which a layer such as the subbing layer is provided, may be beforehand subject to surface treatment such as corona discharge treatment, plasma treatment, flame treatment, and ultraviolet light treatment, so as to improve adhesion between the support film and the layer.

On one surface of the support film, an image-receiving layer is provided. The image-receiving layer generally comprises a resin, and if desired, inorganic fine particles and/or organic fine particles. Water-soluble resins, emulsion resins, and resins soluble in organic solvents are employable for the formation of the image-receiving layer.

Examples of the water-soluble resins include: resins having a hydroxyl group as a hydrophilic constitutional unit, such as polyvinyl alcohol (PVA), ethylene-modified polyvinyl alcohol, chitins, starch and cellulose resin (e.g., methyl cellulose (MC), ethyl cellulose (EC), hydroxyethyl cellulose (HEC) and carboxymethyl cellulose (CMC)); resins having an ether linkage, such as polyethylene oxide (PEO), polypropylene oxide (PPO), polyethylene glycol (PEG), and polyvinyl ether (PVE); and resins having an amide group or an amide linkage, such as polyacrylamide (PAAM), polyvinyl pyrrolidone (PVP), and a copolymer of pyrrolidone; resins having a carboxyl group as dissociation group, such as polyacrylic acid salts, maleic acid resins, alginic acid salts and gelatins; resins having sulfone group, such as polystyrenesulfonic acid salts; and resins having an amino group, imino group, tertiary amine or quaternary ammonium salt, such as polyallylamine (PAA), polyethyleneimine (PEI), epoxidized polyamide (EPAm), polyvinyl pyridine and gelatins. Among the above, polyvinyl alcohol (PVA) is preferably used for ink-jet recording. Particularly, polyvinyl alcohol (PVA) having a saponification degree of 70 to 90 mol % is particularly preferred.

Examples of the resins soluble in organic solvents include polyester, polyamide, polyurethane, melamine resin, phenol resin, styrene/butadiene copolymer, polyvinylidene chloride, polyvinyl chloride, polyvinyl acetate, polyvinyl formal, polyvinyl butyral, polyvinylidene fluoride and acrylic resin.

Examples of the emulsion resins include styrene/butadiene copolymer, polyvinylidene chloride, polyvinyl chloride, polyvinyl acetate, polyvinylidene fluoride, polyester, polyamide, polyurethane, acrylic resin, and polyolefin resin (e.g., ethylene-acrylic acid copolymer, ethylene-sodium acrylate copolymer, ethylene-acrylic ester copolymer, ethylene-vinyl alcohol copolymer, ionomer resin, urethane-modified polyolefin resin).

In addition to the resin, the image-receiving layer may contain auxiliary additives such as matting agents to reduce friction properties; various surface active agents to improve coating properties and surface smoothness; and various kinds of antioxidants, ultraviolet light absorbers, and fluorescent brightening agents to keep a colorant from deteriorating.

The image-receiving layer for ink-jet recording preferably comprises crosslinked polymer fine particles having a mean grain size of not more than 200 nm or a basic polymer latex represented by the hereinafter illustrated formula (I), as well as the water-soluble resin described above.

The water-soluble resin is preferably cured by a crosslinking agent, so as to improve water resistance of the image-receiving layer. The image-receiving layer is preferably formed by the steps of: adding the crosslinking agent to a liquid containing crosslinked polymer fine particles or basic polymer latex, as well as the water-soluble resin, to prepare a coating liquid; applying the coating liquid onto the support (or the subbing layer); and drying the coated layer under heating to cure (crosslink) the coated layer.

Examples of the crosslinking agents include: aldehydes (e.g., formaldehyde, glyoxal, and glutaraldehyde); N-methylol compounds (e.g., dimethylol urea and methyloldimethylhydantoin); dioxane derivatives (e.g., 2,3-di-hydroxydioxane); compounds capable of reacting by activation of carboxyl group of polymer (e.g., carbenium, 2-naphthalene sulfonate, 1,1-bispyrrolydino-1-chloropyridinium, and 1-morphorinocarbonyl-3-(sulfonatoaminomethyl)); activated vinyl compounds (e.g., 1,3,5-triacryloyl-hexahydro-s-triazine, bis(vinylsulfone) methane, and N,N'-methylenebis-[β-(vinylsulfonyl) propionamide]); active halogen compounds (e.g., 2,4-dichloro-6-hydroxy-s-triazine); compounds having an epoxy group (e.g., bisphenol A-type epoxy resin, versatic acid glycidyl ester, phenylglycidyl ether); isooxazoles; melamine resin; isocyanate compounds and dialdehyde starch. These crosslinking agents can be employed singly or in combination. Among the above compounds, melamine resin and aldehydes such as glutaraldehyde are preferred from the viewpoint of productivity because they have a high reactivity. Polyvinyl alcohol is a water-soluble resin preferably employable in combination with the above-mentioned crosslinking agent.

The crosslinking agent is preferably employed in the amount of 0.1 to 20 weight %, more preferably 0.5 to 15 weight %, based on the weight of water-soluble resin.

The image-receiving layer preferably contains crosslinked polymer particles having a mean particle size of not more than 200 nm (preferably not less than 1 nm). The polymer particles preferably are anionic or cationic ones. The polymer particles can be generally prepared by emulsion polymerization of at least one monomer selected from the group consisting of alkyl acrylates, alkyl methacrylates, styrene and styrene derivatives; with an emulsifier having at least one (preferably two or more) carbon—carbon double bond in its molecular structure.

Examples of alkyl acrylates and alkyl methacrylates include: an alkyl (meth)acrylate having an alkyl group of 1–18 carbon atoms (e.g., methyl (meth)acrylate, ethyl (meth)acrylate, n-propyl (meth)acrylate, isopropyl (meth) acrylate, n-butyl (meth)acrylate, isobutyl (meth)acrylate, 2-ethylhexyl (meth)acrylate, and stearyl (meth)acrylate). Examples of styrene and styrene derivatives include styrene, α-methylstyrene, and vinyltoluene.

Other monomers copolymerizable with the above monomers can be also employed in an amount of not more than 50 weight % based on the total amount of monomers. Examples of such monomers include: anionic vinyl monomers (e.g., acrylic acid, methacrylic acid, maleic anhydride, styrenesulfonic acid, 2-acrylamide-2-methylpropanesulfonic acid); cationic vinyl monomers (e.g., dimethylaminoethyl (meth)acrylate, diethylaminoethyl (meth)acrylate, and a vinyl monomer having quaternary ammonium salt); and nonionic vinyl monomers (e.g., 2-hydroxyethyl (meth)acrylate, and (meth) acryloyloxyphosphoate).

In addition to the above monomers, crosslinking vinyl monomers can be also employed in an amount of not more than 5 weight % based on the total amount of monomers. Examples of the monomers include: bifunctional monomers (e.g., ethylene glycol di(meth)acrylate, triethylene glycol di(meth)acrylate, hexamethylenebis(meth)acrylamide, and divinylbenzene); trifunctional monomers (e.g., 1,3,5-triacryloylhexahydro-s-triazine and triallylisocyanurate); and tetrafunctional monomers (e.g., N,N,N',N'-tetraallyl-1,4-diaminobutane).

The emulsifier employable for forming the crosslinked polymer particles comprises a group having at least one (preferably two or more) carbon—carbon double bond. Examples of these groups include (meth)allyl group, 1-propenyl group, 2-methyl-1-propenyl group, vinyl group, isopropyl group, and (meth)acryloyl group. The (meth) acryloyl group is preferred.

The emulsifier generally has both a hydrophobic group and a hydrophilic group (cationic or anionic group) showing emulsification action. The cationic group is capable of giving a good property for retaining the ink on the image-receiving layer, and therefore it improves the water resistance of the layer. The emulsifier, hence, preferably has a cationic group. Examples of the cationic or anionic groups include —COOH, —COOM, —$OSO_3M$, —N($R^1$) ($R^2$) ($R^3$), —OH, —$PO(OM)_2$, (—$O)_3P$, (—$O)_2P(OH)$—, —OP $(OH)_2$—, —$OPO(OM)_2$, —(—$O)_2PO(OM)$, (—$O)_3PO$ and —(OR)—; wherein M represents Na or K, each of $R^1$, $R^2$ and $R^3$ independently represents hydrogen, alkyl, aralkyl or hydroxyalkyl, and R represents ethylene or propylene. A preferred group is —N($R^1$) ($R^2$) ($R^3$) in which each of $R^1$, $R^2$ and $R^3$ independently represents hydrogen, alkyl or hydroxyalkyl, provided that at least one of R1, $R^2$ and $R^3$ is alkyl or hydroxyalkyl.

The emulsifier preferably has both functions of emulsifying and polymerizing (crosslinking). Therefore, the cationic or anionic groups are generally present on the surfaces of the crosslinked polymer particles, although the group may be present inside of the particles.

Examples of the emulsifiers include salts of sulfosuccinic acid ester of polyoxyethylene alkyl ether having two or more carbon—carbon double bonds in. its molecule, salts of sulfuric acid ester of polyoxyethylene alkyl ether having two or more carbon—carbon double bonds in its molecule, salts of sulfosuccinic acid of polyoxyethylene alkylphenyl ether having two or more carbon—carbon double bonds in its molecule, salts of sulfuric acid ester of polyoxyethylene alkylphenyl ether having two or more carbon—carbon double bonds in its molecule, acidic (meth)acrylate phosphate, phosphoric acid oligoester (meth)acrylate or its alkaline salt, and oligoester poly(meth)acrylate of polyalkylene glycol derivative having a hydrophilic alkylene oxide group. The examples are commercially available as KAYAMER PM-2 (trade name, manufactured by Nippon Kayaku Co., Ltd.), and New Frontier A-292E and N-250Z (trade name, manufactured by Dai-ichi Kogyo Seiyaku Co., Ltd.).

In the case that the emulsifier having two or more carbon—carbon double bonds is employed, an emulsifier having only one carbon—carbon double bond can be also used in an amount of not more than 60 weight % based on the total amount of emulsifier. An ordinary anionic, cationic or nonionic emulsifier may be further contained in the above emulsifier having carbon—carbon double bond.

The emulsifier having at least one carbon—carbon double bond is generally used in an amount of 1 to 20 weight %, preferably 3 to 10 weight %, based on the total amount of monomers.

The crosslinked polymer particles can be obtained from the above materials, according to the known emulsion polymerization method.

For instance, the particles can be prepared by the steps of: placing the emulsifier and water in a vessel to prepare a reaction solution; adding the monomer to the solution to emulsify the monomer; further adding a polymerization initiator to the emulsion; and heating the emulsion under stirring to polymerize the monomer and emulsifier. The monomer may be added dropwise or in a lump. The concentration of each material (monomer, emulsifier, initiator) is generally adjusted so that the resultant emulsion may have a solid content of 20 to 50 weight % (preferably 30 to 45 weight %). In the reaction, pH is generally controlled in the range of 3 to 9. The temperature is generally controlled in the range of 40 to 90° C. (preferably 50 to 80° C.), although it is not restricted as far as the initiator can be activated. The reaction is generally performed for 30 minutes to 2 hours.

Examples of the polymerization initiators include: water soluble radical polymerization initiators such as peroxodisulfates (e.g., potassium peroxodisulfate, and ammonium peroxodisulfate), hydrogen peroxide, and water-soluble azo initiators; and redox polymerization initiators such as combination of the above peroxodisulfates and reducing agents (e.g., sodium hydrogensulfite and sodium thiosulfate). Among them, the redox polymerization initiators are preferred. The polymerization initiator is generally emuployed in an amount of 0.05 to 5 weight %, preferably 0.1 to 3 weight %, based on the total amount of monomer.

In order to impart extremely fine size and high transparency to the crosslinked polymer particles, the polymerization reaction is preferably carried out in the presence of a transition metal ion which serves as polymerization accelerator.

The crosslinked polymer particle prepared in the above manner has the emulsifier on the surface thereof, and consequently the cationic or anionic groups (hydrophilic groups) of the emulsifier are generally present on the surface of the crosslinked polymer particles. Therefore, an aqueous ink of ink-jet recording (i.e., ink-jet printer) can be easily adsorbed on the surface of the particles. A part of the cationic or anionic groups may be present inside of the polymer particles, depending on the nature or amount of the emulsifier or polymerization method.

The resultant reaction liquid containing the crosslinked polymer particles generally has a solid content of 20 to 50 weight % (preferably 30 to 45 weight %), and a mean grain size of the particles is not more than 200 nm, preferably in the range of 1 to 100 nm. The reaction liquid (containing the particles) of a solid content of 40 weight % generally has a viscosity of 100 to 500 cps.

The ratio between the crosslinked polymer particles and the water-soluble resin is generally in the range of 1:1 to 1:10 (polymer particles:resin) by weight, preferably in the range of 1:1 to 1:5.

The basic polymer latex preferably employable for forming an image-receiving layer for ink-jet recording is represented by the following formula (I):

$$-(A)_x-(B)_y-(C)_z- \qquad (I)$$

in which A represents a monomer unit comprising an ethylenic unsaturated double bond and a basic group such as a tertiary amino group and a quaternary ammnium base; B represents a monomer unit comprising at least two ethylenic unsaturated double bonds; C represents a monomer unit having an ethylenic unsaturated double bond but differing from the monomer units of A and B; x means 10 to 90 mol %; y means 0 to 90 mol %; and z means 0 to 90 mol %.

The monomer unit of A in the formula (I) generally comprises an ethylenic unsaturated double bond and quaternary ammonium base, and preferably has the structure represented by one of the following formulas (II), (III) and (IV):

(II)

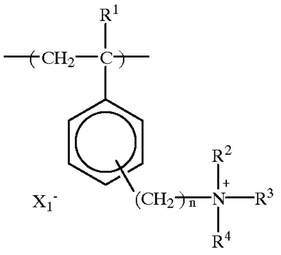

(III)

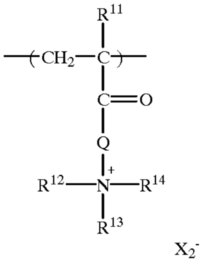

-continued (IV)

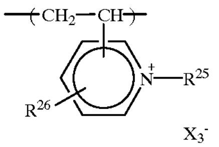

In the formula (II), $R^1$ represents a hydrogen atom or an alkyl group of 1–6 carbon atoms (e.g., methyl, ethyl, and n-hexyl). Preferably, $R^1$ is hydrogen atom.

In the formula (II), each of $R^2$, $R^3$ and $R^4$ independently represents an alkyl group of 1–6 carbon atoms or an aralkyl group of 7–10 carbon atoms. Otherwise, at least two of $R^2$, $R^3$ and $R^4$ may be combined to form a ring containing a nitrogen atom.

The above alkyl group and aralkyl group may have substituent groups. Examples include alkyl groups such as methyl, ethyl, n-propyl and n-hexyl; substituted alkyl groups such as hydroxyalkyl (e.g., 2-hydroxyethyl, 3-hydroxypropyl, and 3-chloro-2-hydroxypropyl), alkoxyalkyl (e.g., methoxymethyl and 2-methoxyethyl), cyanoalkyl (e.g., 2-cyanoethyl), halogenated alkyl (e.g., 2-chloroethyl), allyl, 2-butenyl and propanyl; aralkyl groups such as benzyl, phenethyl and diphenylmethyl; and substituted aralkyl groups such as alkylaralkyl (e.g., 4-methylbenzyl and 2,5-dimethylbenzyl), alkoxyaralkyl (e.g. 4-methoxybenzyl), cyanoaralkyl (e.g., 4-cyanobenzyl), and halogenated aralkyl (e.g., chlorobenzyl).

Examples of the rings formed by $R^2$ and $R^3$ include pyrrolidine, piperidine, and morpholine. Examples of the rings formed by $R^2$, $R^3$ and $R^4$ include imidazole, 2-methylimidazole, triazole, pyridine, 2-methylpyridine, 3-methylpyridine, 4-methylpyridine, and quinuclidine.

Preferably, each of $R^2$, $R^3$ and $R^4$ is an unsubstituted or hydroxyl-substituted alkyl group of 1–3 carbon atom, or an aralkyl group described above. It is particularly preferred that $R^2$ and $R^3$ are combined to form piperidine, and $R^4$ is an unsubstituted or hydroxyl-substituted alkyl group of 1–3 carbon atom.

In the formula (II), $X_1^-$ represents an anion. Examples of the anions include halogen ions (e.g., chloride ion and bromide ion); alkylsulfate ions (e.g., methylsulfate ion and ethylsulfate ion); alkyl or arylsufonate ion (e.g., methylsulfonate ion and benzenesulfonate ion); acetate ion and sulfate ion. Among them, halogen ions (e.g., chloride ion), alkylsulfate ions (e.g., ethylsulfate ion) and acetate ion are preferred.

In the formula (II), n represents an integer of 0, 1 or 2.

In the formula (III), each of $R^{11}$, $R^{12}$, $R^{13}$ and $R^{14}$ has the same meaning as that of $R^1$, $R^2$, $R^3$ and $R^4$ of the formula (II), respectively. Q represents a divalent group of 1–20 carbon atoms. Exauples of the group include: alkylene groups (e.g., methylene and ethylene); arylene groups (e.g., —Ph—R— wherein Ph represents 1,4-phenylene group and R represents an alkylene group of 1–6 carbon atoms or a single bond, —OR'— wherein R' represents an alkylene group of 1–6 carbon atoms such as oxyethylene and oxytrimethylene, —NHR'—, —N(R")R'— wherein R' is the same as the above, and R" represents an alkyl group of 1–6 carbon atoms or an aralkyl group of 7–12 carbon atoms, —NH—Ph—R'—, —Ph—NH—R'—N(R")—Ph—R— wherein each of R,R' and R" is the same as the above). $X_2^-$ has the same meaning as that of $X_1^-$. $R^{11}$ preferably is a hydrogen atom or methyl group. Preferably, each of $R^{11}$, $R^{12}$, $R^{13}$ and $R^{14}$ is an unsubstituted or hydroxyl-substituted alkyl group of 1–3 carbon atom. It is also preferred that $R^{12}$ and $R^{13}$ are combined to form piperidine and $R^{14}$ is an unsubstituted or hydroxyl-substituted alkyl group of 1–3 carbon atom or an aralkyl group described above. Q preferably is —OR'— or —NHR'— wherein R' represents ethylene or propylene.

In the formula (IV), $R^{25}$ represents an alkyl group of 1–12 carbon atom or an aralkyl group of 7–12 carbon atoms. The alkyl group and aralkyl group may have one or more substituent groups. Examples of the alkyl groups and aralkyl groups are the same as those of $R^2$, $R^3$ and $R^4$. $X_3^-$ has the same meaning as that of $X_1^-$. $R^{25}$ preferably is an unsubstituted or hydroxyl-substituted alkyl group of 1–4 carbon or aralkyl group of 7–9 carbon atoms. $R^{26}$ represents a hydrogen atom or an alkyl group of 1–4 carbon (e.g., methyl and ethyl), and preferably it represents a hydrogen atom or methyl group.

The monomer unit of B in the formula (I) preferably has the structure represented by the following formula (V)

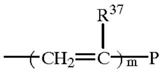

wherein $R^{37}$ represents a hydrogen atom or methyl group, P represents a group connecting the adjoining vinyl groups $((CH_2{=}CR^{37})_m$—), and m represents an integer of 2, 3 or 4. Examples of the connecting groups of P include: amide groups (e.g., sulfonamide); ester groups (e.g., sulfonic ester); alkylene groups (e.g., methylene, ethylene, and trimethylene); arylene groups (e.g., phenylene), and aryleneoxycarbonyl group (e.g., phenyleneoxycarbonyl).

Examples of the monomers constituting the monomer unit of the formula (V) include divinylbenzene, ethyleneglycol dimethacylate, propyleneglycol dimethacylate, neopentylglycol dimethacylate, tetramethyleneglycol di-methacylate, and trimethylolprcpane triacrylate. Among them, divinylbenzene, ethyleneglycol dimethacylate and propyleneglycol dimethacylate are preferred.

The monomer unit of C in the formula (I) is a monomer unit having ethylenic unsaturated double bond but differs from any of the monomer units of A and B. Such monomer unit can be formed from a known monomer having one ethylenic unsaturated double bond. Examples of the monomers constituting the monomer unit of C include ethylene, propylene, 1-butene, isobutene, styrene, α-methylstyrene, vinyltoluene, acrylic acid, methacrylic acid, acrylonitrile, aliphatic ester having ethylenic unsaturated double bond (e.g., vinyl acetate, allyl acetate), mono- or di-carbonic ester having ethylenic unsaturated double bond (e.g., methyl methacrylate, ethyl acrylate, n-butyl methacrylate, n-hexyl methacrylate, n-octyl acrylate, benzylacrylate, cyclohexyl methacrylate, 2-ethylhexyl methacrylate), and dienes (e.g., butadiene, isoprene). Among the above compounds, styrene, cyclohexyl methacrylate and methyl methacrylate are preferred. The monomer unit of C may be formed from two or more of the above-mentioned monomers.

Preferably, in the formula (I), x is in the range of 30 to 99 mol %, y is in the range of 1 to 8 mol % and z is in the range of 10 to 80 mol %.

Preferred structures for the basic polymer represented by the formula (I) are shown below. In each of the following formulas, a subscript number of the repeating unit means percent content (mol %).

(1)
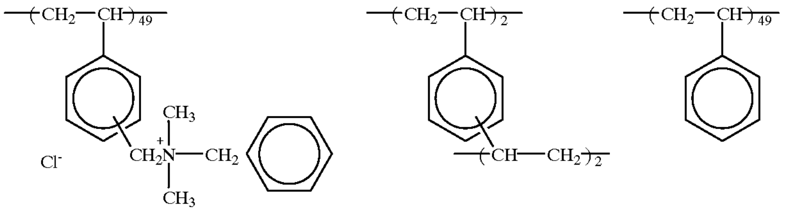
(2)
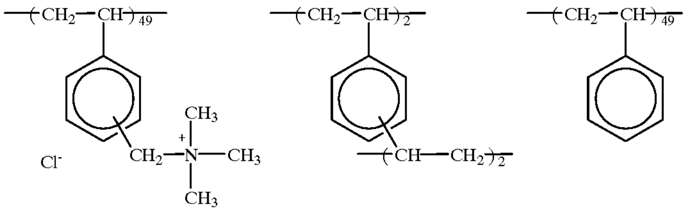
(3)
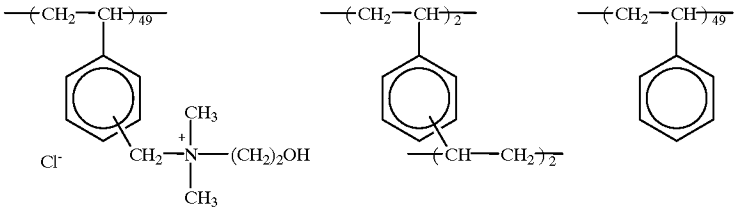
(4)
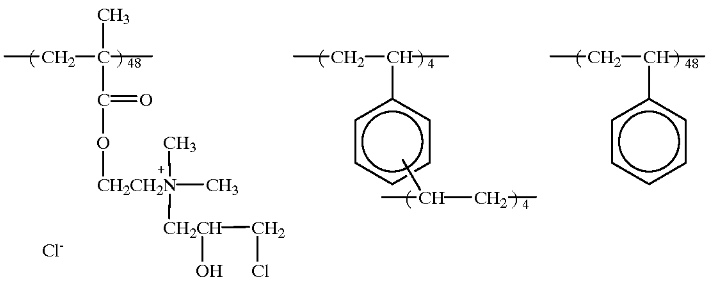
(5)
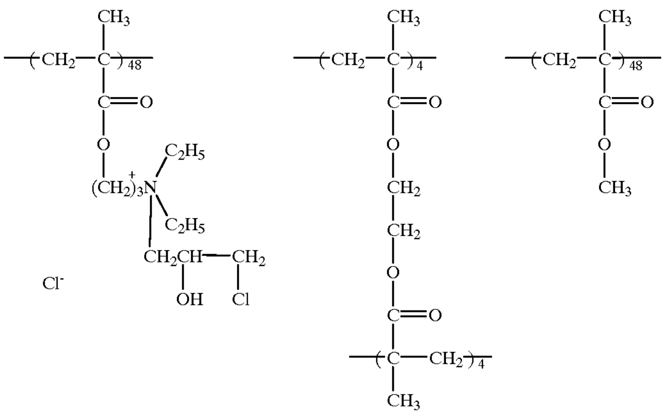

-continued
(6)
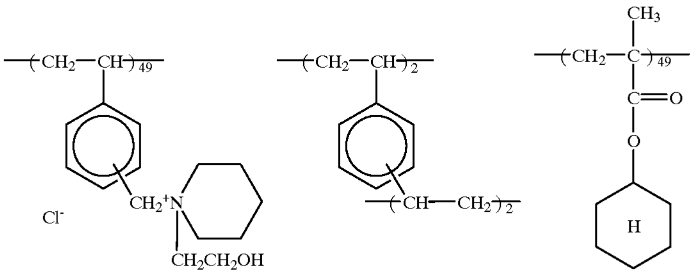
(7)
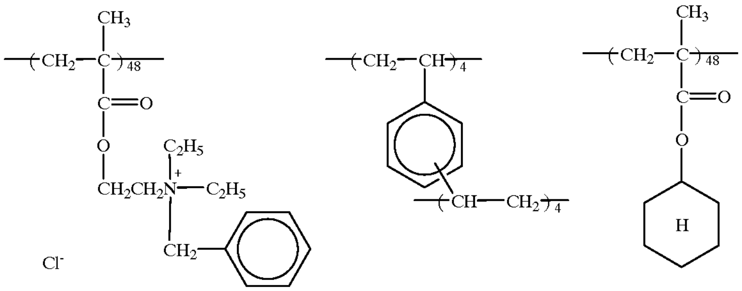
(8)
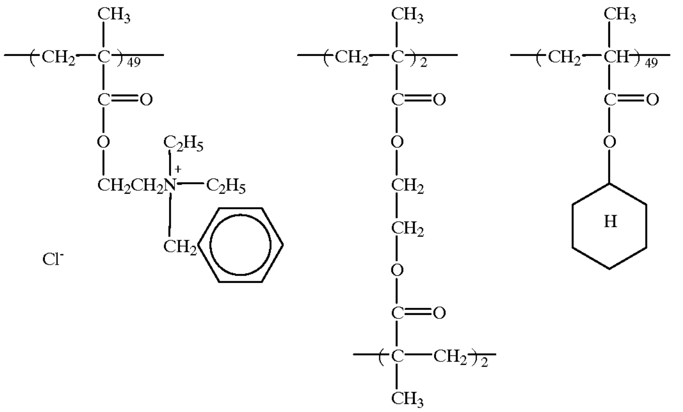
(9)
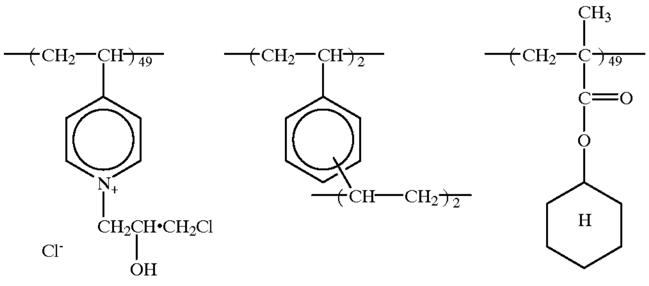
(10)
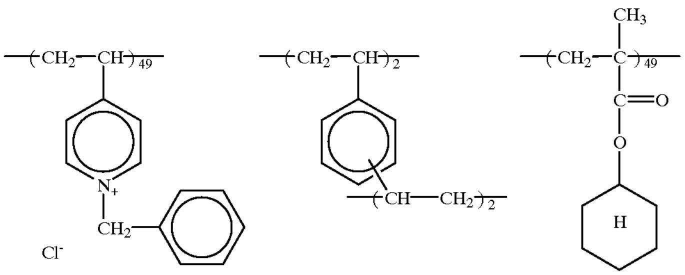

-continued (11)

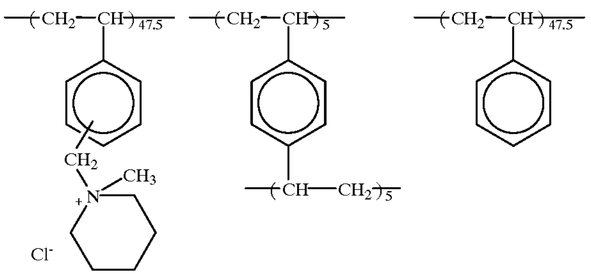

The basic polymer latex can be synthesized according to the known emulsion polymerization method. In more detail, the polymer can be prepare by emulsion polymerization of constitutional monomers in the presence of an anionic, cationic or nonionic surface active agent and a radical polymerization initiator (e.g., a combination of potassium persulfate and potassium hydrogensulfite). The detailed polymerization methods are described in Japanese Patent Publication No. 62-11678, pp. 8–9.

The basic polymer latex of the formula (I) generally is a dispersion having a solid content of 10 to 50 weight % (preferably 20 to 45 weight %), and a mean particle size of the dispersed phase is in the range of 0.1 to 5 μm (preferably 0.3 to 2 μm). The polymer latex of a solid content of 40 weight % generally has a viscosity of 10 to 500 cps.

In the case that an image-receiving layer for ink-jet recording is formed of the above alkaline polymer latex and water-soluble resin, the ratio between the latex and the resin is generally in the range of 5:5 to 1:9 (latex:resin) by weight, preferably in the range of 4:6 to 2:8.

The image-receiving layer for ink-jet recording is generally formed of a combination of the basic polymer latex and the water-soluble resin, or a combination of the crosslinked polymer fine particles and the water-soluble resin. The layer, however, may contain both the basic (or alkaline) polymer latex and crosslinked polymer particles.

Further, the image-receiving layer for ink-jet recording can be also formed of a combination of the water-soluble resin and inorganic fine particles having refractive index of 1.40 to 1.60. Such particles hardly reduce the transparency of the layer. Examples of the inorganic fine particles include silica particles, colloidal silica, calcium silicate, pseudoboemite, zeolite, kaolinite, halloysite, muscovite, talc, calcium carbonate, and calcium sulfate.

As the inorganic particles, silica fine particles having a primary mean particle size of not more than 10 nm can be preferably employed. If such silica particles are used under the condition that the ratio between silica and water-soluble resin is in the range of 1.5:1 to 10:1 (silica:resin) by weight, the resultant layer favorably has a large void volume.

In the case that the layer comprises the silica particles and the water-soluble resin, the particles preferably form agglomerated secondary particles of a mean grain of 10 to 100 nm (preferably 20 to 50 nm). The void volume of such layer preferably is in the range of 56 to 80%. The void in the layer is generally constituted of a great number of capillary spaces, which preferably have a mean diameter of 5 to 30 nm (preferably 10 to 20 nm) and a mean volume of 0.5 to 0.9 ml/g (preferably 0.6 to 0.9 ml/g). The layer preferably has a specific surface area of 100 to 250 $m^2/g$ (more preferably 120 to 200 $m^2/g$), and a light transmittance of the image-receiving layer preferably is not less than 70%.

In the case that the image-receiving layer for ink-jet recording is formed of the water-soluble resin and either the basic polymer latex or the crosslinked polymer particles, the layer may further contain a matting agent to improve friction properties on the surface of the image recording sheet (i.e., improvement of running property and blocking property). Examples of the matting agents include inorganic particles such as silica, colloidal silica, calcium silicate, zeolite, kaolinite, halloysite, muscovite, talc, calcium carbonate, calcium sulfate, and boehmite; and organic polymer particles such as polymethyl methacrylate particles, polystyrene particles, and polyethylene particles. Among them, silica, colloidal silica and polymethyl methacrylate particles are preferred. The layer preferably contains the matting agent in an amount of 0.01 to 5 weight %.

Each of the image-receiving layer materials, such as the water-soluble resin, the basic polymer latex and the crosslinked polymer particles, may be used singly or in combination of plural kinds. Although the layer is mainly composed of the water-soluble resin and the crosslinked polymer particles (or the basic polymer latex), it may further contain various kinds of inorganic salts to improve dispersibility of the particles, and acids or alkaline materials as pH adjusting agents. The layer may further contain various surface active agents to enhance coating properties and surface smoothness. Moreover, the layer may also contain mordants to fix dyes and to enhance water resistance in ink-jet recording. The layer may further contain various kinds of antioxidants and ultraviolet light absorbers to inhibit deterioration of a colorant. Furthermore, the layer may contain fluorescent brightening agents.

The image-receiving layer for ink-jet recording can be prepared, for example, in the manner described below.

An aqueous dispersion (coating liquid) containing the water-soluble resin and the dispersed portion (such as the alkaline polymer latex, the crosslinked polymer particles or inorganic particles) is coated on one surface (the reverse surface of the white coated layer side) of the support film, by conventional means such as air doctor coater, blade coater, rod coater, knife coater, squeeze coater, reverse coater, or bar coater. Subsequently, the coated layer is heated to dry to form the image-receiving layer. The drying procedure is generally carried out by means of a hot air dryer at a temperature of 50 to 180° C. for 1 to 20 minutes, preferably at a temperature of 90 to 150° C. for 2 to 15 minutes. The thickness of the resultant layer generally is in the range of 1 to 50 μm (preferably 5 to 30 μm).

The image-receiving layer for electrophotography generally comprises a thermoplastic resin. As the thermoplastic resin, a polymer having a glass transition temperature of not lower than 35° C. (preferably 45 to 120° C.) is generally employed. Examples of the thermoplastic polymers include polyester resin, polyether resin, acrylic resin, epoxy resin, urethane resin, amino resin, and phenol resin. The polymer may be soluble in organic solvents or in water, or it also may be in the form of an emulsion. Preferably, the polymer is soluble in organic solvents.

In the case that a color image is formed using a color toner on the image-receiving layer, four kinds of color toners must be transferred and fixed on the layer. Therefore, the polymer used for the image-receiving layer is required to have a high cohesive energy. In such case, polyesters (particularly, aromatic polyesters) are preferably employed as the thermoplastic polymers. One preferred aromatic polyester comprises at least one dibasic acid-repeating unit selected from the group consisting of terephthalic acid unit and 2,6-naphthalene-dicarboxylic acid unit; and at least one dihydric alcohol-repeating unit selected from the group consisting of ethylene glycol unit, triethylene glycol unit, bisphenol A-ethyleneoxide adduct unit and bisphenol A-isopropyleneoxide adduct unit. If the above polyester is desired to be water-soluble or in the form of an emulsion, a sulfobenzenedicarboxylic acid unit must be introduced into the molecular structure thereof.

Since the above aromatic polyester (particularly, polymer comprising bisphenol A-ethyleneoxide adduct unit) properly softens at the toner fixing temperature, the toner can be embedded into the image-receiving layer so that the resultant image may have a smooth surface.

Another preferred aromatic polyester comprises: dibasic acid-repeating unit having sulfobenzenedicarboxylic acid unit and at least one dicarboxylic acid unit selected from the group consisting of terephthalic acid unit and 2,6-naphthalenedicarboxylic acid unit; and di-hydric alcohol-repeating unit having at least one diol unit selected from the group consisting of bisphenol A-ethyleneoxide adduct unit and bisphenol A-isopropyleneoxide adduct unit.

A further preferred aromatic polyester comprises: dibasic acid repeating unit having sulfobenzenedicarboxylic acid unit (preferably in an amount of 5 to 17 mol %) and at least one dicarboxylic acid unit selected from the group consisting of terephthalic acid unit and 2,6-naphthalenedicarboxylic acid unit; and dihydric alcohol-repeating unit having at least one diol unit selected from the group consisting of ethylene glycol unit, triethylene glycol unit and bisphenol A-ethyleneoxide adduct unit.

The unit derived from the sulfobenzenedicarboxylic acid or its alkyl- or hydroxyalkyl ester is contained in the above polyester. Examples of the hydroxyalkyl groups include hydroxyethyl, hydroxypropyl, hydroxyisopropyl and hydroxybutyl. Examples of the alkyl groups include methyl, ethyl, isopropyl, propyl and butyl. Among them, hydroxyethyl is preferred. Preferably, the sulfo group in the unit forms a salt with sodium, potassium, or lithium (sodium salt is particularly preferred). The unit is preferably derived from isophthalic acid, terephthalic acid, phthalic acid, or their lower alkyl or hydroxyalkyl esters, provided that each contains sulfonic metal base. The isophthalic acid containing an alkaline metal salt of the sulfonic group, and its lower alkyl or hydroxyalkyl ester are preferred. Further, methyl or hydroxyethyl isophthalate containing an alkaline metal salt of the sulfonic group is particularly preferred.

In the bisphenol A-ethyleneoxide adduct, the amount of ethyleneoxide adduct is preferably in the range of 1 to 5 mol. (more preferably 1 or 2 mol.) per 1 mol. of bisphenol A. In the bisphenol A-isopropyleneoxide adduct, the amount of isopropyleneoxide adduct preferably is in the range of 1 to 5 mol. (more preferably 1 or 2 mol.) per 1 mol. of bisphenol A.

The number-average molecular weight of the above polyester preferably is in the range of 1,500 to 5,000, and the weight-average molecular weight is preferably in the range of 2,500 to 15,000. The ratio of weight-average molecular weight to number-average molecular weight preferably is in the range of 1.2 to 3.0.

The image-receiving layer for electrophotography may contain a matting agent to improve friction properties on the surface of the image recording sheet (i.e., improvement of wear resistance and scratch resistance). Examples of the matting agents include fluororesin, lower polyolefin polymer (e.g., polyethylene matting agent, or paraffin or microcrystalline wax emulsion), beads of plastic material (e.g., crosslinked PMMA, polycarbonate, polyethylene terephthalate, polyethylene, and polystyrene), inorganic particles (e.g., $SiO_2$, $Al_2O_3$, kaolin, talc). The layer preferably contains the matting agent in an amount of 0.1 to 10 weight %.

The image-receiving layer for electrophotography preferably has a surface electric resistance of $1\times10^{10}$ to $1\times10^{14}$ Ω (at 25° C., 65% RH). If the resistance is lower than $1\times10^{10}$ Ω, an enough amount of toner cannot be transferred onto the image-receiving layer so that only a very thin image is obtained. The resistance of higher than $1\times10^{14}$ Ω also gives a very thin image, because electric charge occurs too much to transfer the image properly. Further, such too much electrified recording sheet is liable to collect dust, and troubles such as feeding error and printing error are often caused.

In order to adjust the surface electric resistance, the image-receiving layer may contain surface active agents. Examples of the surface active agents include alkylbenzeneimidazole sulfonate, naphthalenesulfonate, carboxylic acid sulfone ester, phosphoric acid ester, heterocyclic amines, ammonium salts, phosphonium salts, betaine amphoteric salts. Metal oxides such as $ZnO_2$, $SnO_2$, $Al_2O_3$, $In_2O_3$, MgO, BaO and $MoO_3$ can be also employed for adjusting the surface electric resistance. For the same purpose, an electroconductive layer containing electroconductive metal oxide particles may be provided between the image-receiving layer and the support (or the subbing layer).

The layer may further contain, if desired, known auxiliary materials such as colorants, ultraviolet light absorbers, crosslinking agents and antioxidants, unless such materials give adverse effect to the electrophotographic performance.

The image-receiving layer for electrophotography can be prepared, for example, by the steps of: dissolving or dispersing the polymer and other materials in water or an organic solvent to prepare a coating liquid; applying the liquid onto one surface (the reverse surface of the white coated layer side) of the support; and heating the coated liquid to dryness, to form the image-receiving layer. The coating procedure can be carried out by conventional means such as air doctor coater, blade coater, rod coater, knife coater, squeeze coater, reverse coater, and bar coater.

The image-receiving layer for electrophotography generally has a thickness of 1 to 8 μm (preferably 2 to 6 μm). If the thickness is below 1 μm, the toner hardly sinks in the layer and the resultant image has a rough surface. On the other hand, if the layer has a thickness of above 8 μm, the agglomerated toner in the layer is liable to be broken in the fixing procedure, and consequently a portion of the printed image is often transferred again (off-set phenomenon).

The image-receiving layer for thermal transfer recording (printing) generally comprises a polyolefin resin. Preferably, the layer comprises hydrophobic particles having a mean particle size of 2 to 15 μm, as well as a polyolefin resin. The term of "polyolefin resin" here means to include not only polymers of olefin (monomer having unsaturated ethylenic double bond) and copolymers of olefin with other polymerizable monomer(s), but also polymerized paraffin (e.g., paraffin wax) which is almost equal to polyolefin. Examples of the polyolefin resins include ethylene-vinyl acetate copolymer, ethylene-acrylic acid copolymer, ethylene-sodium acrylate copolymer, ethylene-acrylic ester copolymer, ethylenevinyl alcohol copolymer, ionomer resin and urethane modified polyolefin resin. Each of the above copolymer resins preferably contains ethylenic component (olefin having no hydrophilic group) in an amount of 80 to 90 weight %. If the amount of the ethylenic component is less than 80 weight %, the resultant image exhibits low color density in its high-light area (which is formed by the least number of the smallest dots). The resin preferably contains a non-ethylenic component (olefin having hydrophilic group) in an amount of 10 to 20 weight %, so as to show a satisfactory emulsifying property. The thickness of the layer is preferably in the range of 0.01 to 20 $\mu$m. The molecular weight of the polyolefin resin preferably is not less than 20,000.

The hydrophobic particles can be formed from various hydrophobic materials. Examples of the hydrophobic materials include polyethylene, polypropylene, polyethylene terephthalate, polystyrene, polycarbonate, acrylic acid resin, methacrylic acid resin, and polyacrylonitrile. Inorganic particles having hydrophobic surface are also employable, but organic particles are preferred. The mean particle size of the hydrophobic particles preferably is in the range of 2 to 15 $\mu$m. If it is less than 2 $\mu$m, the sheet sometimes exhibits unsatisfactory conveying property. If the mean particle size is more than 15 $\mu$m, a coating liquid for preparing the layer is sometimes unstable and consequently the resultant layer may have an insufficient transparency. The amount of the particles generally is in the range of 0.01 to 10 weight %, preferably 0.5 to 5 weight %, based on that of the polyolefin resin. If it is less than 0.01 weight %, the sheet sometimes exhibits an unsatisfactory conveying property. If the amount is more than 10 weight %, a coating liquid for preparing the layer sometimes is unstable and consequently the resultant layer may have insufficient transparency.

The layer may contain polyolefin resin particles of lower molecular weight as lubricant. In such case, the mean particle size of the particles preferably is in the range of 1 to 3 $\mu$m. The weight-average molecular weight if, thereof preferably is in the range of 1,000 to 6,000.

Preferably, the electroconductive layer is provided on the subbing layer, and the image-receiving layer is then provided on the electroconductive layer. The subbing layer can be formed of the above-described materials (gelatin is particularly preferred).

The electroconductive layer generally contains particles of electroconductive metal oxide, and particles of crystalline metal oxides are preferred. Examples of the crystalline metal oxides include ZnO, $SiO_2$, $TiO_2$, $Al_2O_3$, $In_2O_3$, MgO, BaO, $MoO_3$, $Sb_2O_5$, and a mixture of these oxides. The mean particle size generally is not more than 0.5 $\mu$m, preferably not more than 0.2 $\mu$m.

The electroconductive layer preferably contains a binder as well as the electroconductive metal oxide particles. As the binder for the electroconductive layer, protein, polysaccharide, synthetic hydrophilic colloid, natural resins and synthetic resins are employable. Examples of the proteins include gelatin, gelatin derivatives, colloidal albumin, and casein. Examples of the polysaccharide include cellulose derivatives (e.g., carboxymethyl cellulose, hydroxyethyl cellulose, diacetyl cellulose, triacetyl cellulose), agar, sodium alginate and starch derivatives. Examples of the synthetic hydrophilic colloids include polyvinyl alcohol, poly-N-vinyl pyrrolidone, polyacrylic acid copolymer, polyacrylamide, derivatives of them, partial hydrolysis products of them, polyvinyl acetate, polyacrylnitrile, polyacrylic esters and copolymers of them. Examples of the natural resins include rosin, shellac, and their derivatives. The synthetic resins are used in the form of an emulsion. Examples of the synthetic resins include styrene/butadiene copolymer, polyacrylic acid, polyacrylic esters and their derivatives, polyvinyl acetate, vinyl acetate-acrylic ester copolymer, polyolefin, and olefin-vinyl acetate copolymer. Other polymers are also employable. Examples of such polymers include carbonate type polymers, polyester type polymers, urethane type polymers, epoxy type polymers, polyvinyl chloride, polyvinylidene chloride and organic semiconductor (polypyrrole). Two or more binders may be used in combination. The ratio of the binder per metal oxide preferably is in the range of 0/100 to 50/50, by weight. The coating amount of the electroconductive layer preferably is in an amount of 10 to 500 $mg/m^2$.

The image-receiving layer for thermal transfer recording (printing) can be formed by applying a coating liquid containing the above materials onto the transparent support (or onto the subbing layer). The coating liquid for the image-receiving layer or the electroconductive layer can be prepared by dispersing the above materials in an appropriate solvent, which can be easily selected by those skilled in the art. There are no specific limitations on the coating method, and any known method can be used. In the coating procedure, auxiliary additives such as coating aids (e.g., saponin, dodecylbenzenesulfonic acid), hardening agents, colorants, ultraviolet light absorbers, and heat-ray interrupter may be added to the coating liquid, if desired.

The image recording sheet of the invention preferably exhibits a degree of glossiness (observed from the image-receiving layer side) of not less than 75%. The degree of glossiness in the specification is defined as a value obtained by the measurement in accordance with JIS P-8142.

The image recording sheet of the invention comprises a white coated layer provided on the other surface (i.e., reverse surface of the image-receiving layer side) of the support film. The white coated layer mainly comprises fine particles and a binder resin, and if desired it may also contain additives.

Examples of the binder resins include polyesters (e.g., polyethylene terephthalate, polyethylene naphthalate), polyamide, polycarbonate, polyethersulfone, polyimide, polyolefin (e.g., polyethylene and polypropylene), polyurethane, cellulose acetate (e.g., cellulose triacetate), styrene/butadiene copolymer, polyvinylidene chloride, polyvinyl chloride, polyvinyl acetate, polyvinyl formal, polyvinyl butyral, polyvinylidene fluoride, and acrylic resin. Styrene/butadiene copolymer, polyvinylidene chloride, polyester resin, polyamide resin, and acrylic resin are preferred. The above polymers can be used in the form of an emulsion or a solution soluble in solvents.

Examples of the fine particles include: white pigment such as titanium oxide (anatase or rutile), zinc oxide, zinc sulfide, lithophone, lead carbonate, (basic) lead sulfate, and antimony oxide; inorganic particles such as extender pigments of barium sulfate, aluminum hydroxide, magnesium carbonate, calcium carbonate, calcium silicate, aluminum silicate, and magnesium silicate; and organic particles such as particles of polymers of carbon fluoride and ethylene tetrafluoride. The white coated layer preferably contains at least one of the above-mentioned white pigments (titanium oxide is particularly preferred). The mean particle size of the particles preferably is in the range of 0.1 to 10 $\mu$m, more, preferably 0.3 to 3 $\mu$m.

The white coated layer generally contains the pigment in an amount of 10 to 80 weight %, preferably 25 to 70 weight %. The weight ratio of the pigment to the binder resin generally is in the range of 2/8 to 8/2, preferably 3/7 to 7/3. The thickness generally is in the range of 1 to 100 μm, more preferably 10 to 80 μm.

The white coated layer can be formed by applying a coating liquid containing the binder resin and the above pigments onto the other surface (i.e., reverse surface of the image-receiving layer side) of the support film, and heating the applied liquid to dryness. The coating procedure can be carried out by conventional means such as air doctor coater, blade coater, rod coater, knife coater, squeeze coater, reverse coater, and bar coater. In the coating procedure, auxiliary additives such as surface active agents (e.g., polyoxyethylenenonylphenyl ether, sodium hexametaphosphate, dodecylbenzene sulfonic acid), hardening agents, colorants, ultraviolet light absorbers and heat-ray interrupter may be added to the coating liquid, if desired.

The drying procedure is generally carried out by means of a hot air dryer at a temperature in the range of 50 to 180° C. for 1 to 60 minutes, preferably at a temperature in the range of 90 to 150° C. for 10 to 30 minutes. The thickness of the layer generally is in the range of 1 to 100 μm (preferably 10 to 80 μm).

The white coated layer generally has a transmittance of not higher than 2 6 (preferably not higher than 1.5 %), and consequently a transmittance for rays incident from the white coated layer side of the recording sheet generally is not higher than 2% (preferably not higher than 1.5%). The transmittance in this specification is defined as a value of transmittance of parallel rays.

The present invention is further described by the following working examples.

EXAMPLE 1

[Image recording sheet for ink-jet recording]

(1) Composition of coating liquid for forming white coated layer:

| | |
|---|---|
| Titanium dioxide (rutile type) | 23 weight parts |
| Barium sulfate | 5 weight parts |
| Acrylic emulsion (solid content: 53 weight %) | 60 weight parts |
| Water | 6 weight parts |
| Hexanol | 5 weight parts |
| Polyoxyethylene-nonylphenyl ether | 0.9 weight part |
| Sodium hexametaphosphate | 0.1 weight part |

The materials of the above composition were mixed to prepare a coating liquid for forming white coated layer.

A surface of a biaxially oriented polyethylene terephthalate film having a thickness of 100 μm was subjected to a corona discharge treatment. The coating liquid obtained above was coated on the treated surface of the film using a wire bar coater of #26, and dried at 120° C. for 10 minutes by means of a hot-air dryer, to form a white coated layer having a dry thickness of 31 μm.

(2) Composition of coating liquid for forming subbing layer:

| | |
|---|---|
| Styrene/butadiene copolymer latex (1) (styrene: butadiene:hydroxyethylacrylate:acrylic acid = 63:33:3:0.5:0.5 (mol. %), solid content: 43 wt. %) | 192 weight parts |

-continued

| | |
|---|---|
| Styrene/butadiene copolymer latex (2) (styrene: butadiene:hydroxyethylacrylate:acrylic acid = 58:40:1:1 (mol %), solid content: 43 wt. %) | 54 weight parts |
| Sodium salt of 2,4-dichloro-6-hydroxy-s-triazine (4 wt. % aqueous solution) | 73 weight parts |
| Water | 681 weight parts |

The materials of the above composition were mixed to prepare a coating liquid for forming subbing layer.

The other surface (i.e., reverse surface of the white coated layer side) of the polyethylene terephthalate film was subjected to a corona discharge treatment. The coating liquid obtained above was coated on the treated surface of the film using a wire bar coater of #3.2, and dried at 120° C. for 5 minutes by means of a hot-air dryer, to form a subbing layer having a dry thickness of 0.6 μm.

(3) Composition of coating liquid for forming image-receiving layer:

| | |
|---|---|
| Polyvinyl alcohol (10 wt. % aqueous solution, saponification degree: 88%, trade name: PVA210, available from Kuraray Co., Ltd.) | 35 weight parts |
| 10 wt. % aqueous dispersion of crosslinked cationic polymer particles (mean particle size: 52 nm, polystyrene particles crosslinked by an emulsion containing two carbon-carbon double bonds and quaternary ammonium base, trade name: MISTPEARL C-150, available from Arakawa Chemical Industries, Ltd.) | 15 weight parts |
| Matting agent (4 wt. % aqueous dispersion polymethyl methacrylate particles, trade name: MX-1000, available from Soken Kagaku Co., Ltd.) | 0.4 weight part |
| Melamine resin (10 wt. % aqueous dispersion, trade name: Sumilase #613, available from Sumitomo Chemical Co., Ltd.) | 4.5 weight parts |
| Amine hydrochloride (5 wt % aqueous dispersion, trade name: ACX-P, available from Sumitomo Chemical Co., Ltd.) | 0.45 weight part |
| Surface active agent (10 wt. % aqueous dispersion of Megafac F-144D, available from Dainippon ink & Chemicals, Inc.,) | 1.0 weight part |

The materials of the above composition were mixed to prepare a coating liquid for forming an image-receiving layer.

The coating liquid obtained above was coated on the subbing layer using a bar coater and dried at 120° C. for 10 minutes by means of a hot-air dryer, to form an image-receiving layer having a dry thickness of 8 μm.

Thus, an ink-jet image recording sheet of the invention comprising a polyethylene terephthalate film support film, a subbing layer and an image-receiving layer provided in this order on one face of the support, and a white coated layer provided on the other surface face of the support was prepared.

COMPARISON EXAMPLE 1

The procedures of Example 1 were repeated except that a high glossy opaque polyethylene terephthalate foamed film containing calcium carbonate (trade name: E-68L, available from Toray industries, Inc.) having a thickness of 130 μm was employed as the support film and that the white coated layer was not provided, to prepare an image recording sheet for ink-jet recording.

With respect to each of the recording sheets above prepared, properties for ink-jet recording were evaluated in the manners described below.

(1) Degree of Glossiness

The glossiness was determined in accordance with JIS P-8142. Each recording sheet was cut to prepare six sample pieces, and the glossiness of each sample was measured by a gloss meter (digital angle-variable gloss meter, produced by Suga Testing Machine Co., Ltd.). An average value for the six samples was calculated to determine the glossiness of each recording sheet. The glossiness of the white coated layer was also measured in the same manner.

(2) Transmittance

The transmittance of parallel rays was measured using a haze meter (HGM-2DP, produced by Suga Testing Machine Co., Ltd.). The transmittance of the white coated layer alone, as well as that of the recording sheet, was also measured. In the measurement for the recording sheet, rays incident from the white coated layer side was observed from the image-receiving layer side to determine the transmittance. In the measurement of the white coated layer alone, the sample was prepared by the steps of forming the layer on a glass plate in the same manner as Example 1 and Comparison Example 1, and then peeling off the formed layer to prepare the sample sheet. The transmittance of thus obtained layer sheet was determined in the same manner described above.

(3) Image Quality (graininess-beading)

Gradation printing with yellow, magenta, cyan, black, blue, green and red (YMCBGR) was conducted on the recording sheet, using an ink-jet color printer (MJ-910, produced by Seiko Epson Co., Ltd.). The printed image was visually observed to evaluate the image quality on its graininess based on the following classification:

AA: almost no grains are observed;

BB: some grains are observed; and

CC: striking grains are noted.

The results are set forth in Table 1.

TABLE 1

| | | Glossiness (%) | | Transmittance (%) | |
|---|---|---|---|---|---|
| | Quality | support | sheet | white layer | sheet |
| Ex. 1 | AA | 99.8* | 93.6 | 1.2 | 1.0 |
| Com. 1 | CC | 49 | 92 | — | 0.5 |

*) glossiness of the free surface of a support provided with only a white coated layer.

EXAMPLE 2

[Image-receiving layer for electrophotography]

A polyethylene terephthalate film provided with a white coated layer was prepared in the same manner as in Example 1.

(1) Composition of coating liquid for forming subbing layer:

| | |
|---|---|
| Styrene/butadiene copolymer latex (styrene: butadiene:hydroxyethyl methacrylate:divinyl-benzene = 67:30:2.5:0.5, by weight) (amount of solid content) | 3.8 weight parts |
| Sodium salt of 2,4-dichloro-6-hydroxy-1,3,5-triazine (crosslinking agent) | 0.1 weight part |
| Titanium oxide fine particles (mean particle size: 88 nm, trade name: SN-88, available from Ishihara Sangyo Co., Ltd.) | 2.0 weight parts |
| Pure water | 94.1 weight parts |

The materials of the above composition were mixed to prepare a coating liquid for forming a subbing layer.

The other surface (i.e., reverse surface of the white coated layer side) of the polyethylene terephthalate film was subjected to a corona discharge treatment. The coating liquid was applied onto the treated surface of the film using a wire bar coater of #2.8, and dried at 180° C. for 1 minute, to form a subbing layer having a dry thickness of 0.25 μm.

(2) Composition of coating liquid for forming image-receiving layer:

| | |
|---|---|
| Polyester resin having the components described below* (as solid content) | 11.6 weight parts |
| Crosslinked PMMA matting agent (mean grain size: 7 μm, trade name: MR-7G, available from Soken Kagaku Co., Ltd.) | 0.06 weight part |
| Methyl ethyl ketone | 72.9 weight parts |

*the components of the above polyester resin

| Polyester Components (mol %) | | | Average Molecular Weight | |
|---|---|---|---|---|
| TP | BAEO | BAPO | Number (Mn) | Weight (Mw) |
| 100.0 | 75.0 | 25.0 | 2,100 | 4,100 |

(Remarks)
TP: terephthalic acid unit;
BAEO: bisphenol A-diethyleneoxide adduct unit (wherein an ethyleneoxide is attached on each terminal of bisphenol A);
BAPO: bisphenol A di-isopropyleneoxide adduct unit (wherein an isopropyleneoxide is attached on each terminal of bisphenol A).

The materials of the above composition were mixed to prepare a coating liquid for forming an image-receiving layer.

The coating liquid was applied onto the subbing layer above formed using a wire bar coater of #10 and dried at 90° C. for 1 minute, to form an image-receiving layer having a dry thickness of 2.0 μm.

Thus, an electrophotographic recording sheet of the invention comprising a polyethylene terephthalate film support, a subbing layer and an image-receiving layer provided in this order on one face of the support, and a white coated layer provided on the other surface of the support was prepared.

COMMPARISON EXAMPLE 2

The procedures of Example 2 were repeated except that a high gloss opaque foamed polyethylene terephthalate film containing calcium carbonate (trade name: E-68L, available from Toray industries, Inc.) having a thickness of 130 μm was employed as the support film and that the white coated layer was not provided, to prepare an image recording sheet for electrophotography.

With respect to each of the recording sheets, properties for electrophotography were evaluated in the manners described below.

(1) Degree of Glossiness

The glossiness was determined in the manner described above.

(2) Transmittance

The transmittance of parallel rays was measured in the manner described above.

(3) Image Quality (graininess-beading)

Gradation printing with yellow, magenta, cyan, black, blue, green and red (YMCBGR) was conducted on the recording sheet, using a full-color electrophotographic copy machine (A color 620, produced by Fuji Xerox Co., Ltd.). The printed image was visually observed to evaluate the image quality with respect to graininess (beading) based on the following classification:

AA: almost no grains are observed;

BB: some grains are observed; and

CC: striking grains are noted.

The results are set forth in Table 2.

TABLE 2

| | | Glossiness (%) | | Transmittance (%) | |
|---|---|---|---|---|---|
| | Quality | support | sheet | white layer | sheet |
| Ex. 2 | AA | 99.7 | 94.0 | 1.2 | 1.0 |
| Com. 2 | CC | 49 | 92 | — | 0.5 |

EXAMPLE 3

[Image-receiving layer for thermal transfer recording]

A polyethylene terephthalate film provided with a white coated layer was prepared in the same manner as in Example 1.

(1) Composition of coating liquid for forming electroconductive layer:

| | |
|---|---|
| Gelatin | 4.5 weight parts |
| Titanium dioxide doped with antimony in an amount of 5 wt. % per that of titanium dioxide (mean grain size: 0.2 μm) | 0.5 weight part |
| Methanol | 70 weight parts |
| Water | 30 weight parts |
| Polyethylene oxide surface active agent | 0.01 weight part |

The materials of the above composition were mixed to prepare a coating liquid for forming an electroconductive layer.

The other surface (i.e., reverse surface of the white coated layer side) of the polyethylene terephthalate film was subjected to a corona discharge treatment. A subbing layer of gelatin was formed on the treated surface. After that, the coating liquid was applied onto the subbing layer in an amount of 5.2 ml/$m^2$, and dried at 130° C. for 5 minutes to form an electroconductive layer.

(2) Composition of coating liquid for forming image-receiving layer:

| | |
|---|---|
| Copolymer of ethylene (85 wt. %) and sodium acrylate (15 wt. %) (glass transition point: 110° C., trade name: Chemipearl S120, available from Mitsui Chemical Industries, Ltd.) | 12 weight parts |
| Polymethyl methacrylate resin particles (mean grain size: 5.8 μm, trade name: MP2700M, available from Saken Kagaku Co., Ltd.) | 0.05 weight part |
| Lower polyolefin resin particles (trade name: Chemipearl WF640, available from Mitsui Chemical Industries, Ltd.) | 0.1 weight part |
| Methanol | 55 weight parts |
| Water | 33 weight parts |

The materials of the above composition were mixed to prepare a coating liquid for forming an image-receiving layer.

The coating liquid was applied onto the electroconductive layer above formed in an amount of 10 ml/$m^2$, and dried at 130° C. for 5 minutes to form an image-receiving layer.

Thus, a thermal transfer recording sheet of the invention comprising a polyethylene terephthalate film support film, a subbing layer, an electroconductive layer and an image-receiving layer provided in this order on one face of the support, and a white coated layer provided on the other face of the support was prepared.

COMPARISON EXAMPLE 3

The procedures of Example 3 were repeated except that a high glossy opaque polyethylene terephthalate foamed film containing calcium carbonate (trade name: E-68L, available from Toray industries, Inc.) having a thickness of 130 μm was employed as the support film and that the white coated layer was not provided, to prepare an image recording sheet for thermal transfer recording.

With respect to each of the image recording sheets, properties for thermal transfer recording were evaluated in the manners described below.

(1) Degree of Glossiness

The glossiness was determined in the manner described above.

(2) Transmittance

The transmittance of parallel rays was measured in the manner described above.

(3) Image Quality (graininess-beading)

Gradation printing with yellow, magenta, cyan, black, blue, green and red (YMCBGR) was conducted on the recording sheet, using a thermal transfer duplicate machine (EC-10, produced by Fuji Xerox Co., Ltd.). The printed image was visually observed to evaluate the image quality in view of graininess (beading) based on the following classification:

AA: almost no grains are observed;

BB: some grains are observed; and

CC: striking grains are noted.

The results are set forth in Table 3.

TABLE 3

| | | Glossiness (%) | | Transmittance (%) | |
|---|---|---|---|---|---|
| | Quality | support | sheet | white layer | sheet |
| Ex. 3 | AA | 99.8 | 93.8 | 1.2 | 1.0 |
| Com. 3 | CC | 49 | 92 | — | 0.5 |

What is claimed is:

1. An image recording sheet comprising a transparent support film having a thickness of 50 to 200 μm, a transparent image-receiving layer coated on one surface of the support film, and a white particle-containing resin layer coated on the other surface of the support film, said image-receiving layer comprising polyolefin resin and hydrophobic particles having a means particle size of 2 to 15 μm and, said white particle-containing resin layer showing a parallel rays transmittance of not more than 2%.

2. The image recording sheet of claim 1, wherein the surface of the image-receiving layer shows a glossiness of not less than 75%.

3. The image recording sheet of claim 1, wherein the white coated layer shows a parallel rays transmittance of not more than 1.5%.

4. The image recording sheet of claim 1, wherein the image-receiving layer comprises a basic polymer latex having the formula (I):

$$-(A)_x-(B)_y-(C)_z- \qquad (I)$$

wherein A represents a monomer unit comprising an ethylenic unsaturated double bond and a basic group selected from the group consisting of a tertiary amino group and a quaternary ammonium base; B represents a monomer unit comprising at least two ethylenic unsaturated double bonds; C represents a monomer unit having an ethylenic unsaturated double bond but differing from the monomer units of A and B; x means 10 to 90 mol %; y means 0 to 90 mol %; and z means 0 to 90 mol %.

5. The image recording sheet of claim 1, wherein the image-receiving layer comprises a thermoplastic polyester resin having a glass transition temperature of 35 to 120° C.

6. The image recording sheet of claim 1, wherein the support film is a biaxially oriented film.

7. The image recording sheet of claim 6, wherein the support film comprises a polyester.

* * * * *